United States Patent

[11] 3,533,443

| [72] | Inventor | Rex L. Jones |
| | | 477 Jewel Court, Montpelier, Idaho 83254 |
| [21] | Appl. No. | 678,826 |
| [22] | Filed | Oct. 30, 1967 |
| [45] | Patented | Oct. 13, 1970 |

[54] MIXING VALVE
3 Claims, 7 Drawing Figs.

[52] U.S. Cl. .................................................. 137/625.17
[51] Int. Cl. ................................................. F16k 11/00
[50] Field of Search .......................................... 137/625.17,
636.4, 625.41

[56] References Cited
UNITED STATES PATENTS

| 2,847,031 | 8/1958 | Brown ......................... | 137/625.41X |
| 2,490,726 | 12/1949 | Bauberger ..................... | 137/625.17 |
| 2,659,898 | 11/1953 | Toye ........................... | 137/625.41X |
| 3,169,549 | 2/1965 | Quick .......................... | 137/625.17 |

FOREIGN PATENTS

| 715,835 | 7/1965 | Canada ......................... | 137/625.17 |

*Primary Examiner*—William R. Cline
*Attorney*—M. Ralph Shaffer

ABSTRACT: This invention relates to mixing valves and, more particularly, to a new and improved mixing valve of versatile and yet inexpensive design. Metering and various flow ratios are provided in a desired continuum, and a novel drain feature permits the valve to be completely exhausted for subsequent usage with possibly dissimilar fluids. The valve is constructed for usage so that both liquids and gases of varying temperatures, pressures, constituencies, or other parameters may be accommodated.

Patented Oct. 13, 1970

3,533,443

INVENTOR.
REX L. JONES

BY

HIS ATTORNEY

MIXING VALVE

Present invention relates to mixing valves and, more particularly, to a new and improved mixing valve incorporating a cylindrical valve body and a cylindrical valve gate operably and slidably disposed therewithin. This simplified construction is used for the purpose of reduction of expense in manufacture; at the same time, the mixing valve accomplishes selective metering of inlets, selective flow ratios for the fluids to be mixed, and adequate drain of the valve after use so that the valve may be employed with various types of fluids without chancing contamination or dilution by previously used fluids.

Accordingly, a principal object of the present invention is to provide a new and improved mixing valve for mixing fluids, whether in a liquid or gaseous state, to achieve a desired output.

Further object of the present invention is to provide an improved mixing valve of simplified and inexpensive construction.

An additional object is to provide an improved mixing valve wherein quantities of prior-used fluids that may be lodged in the valve may drain out of the same when the valve is in shutoff condition, thereby conditioning the valve for new usage with possibly dissimilar fluids.

Another object of the invention is to provide a mixing valve wherein ratios of incoming fluids can be varied and/or metering accomplished in a direct manner.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

in FIG. 1 the valve is shown in its operating condition.

Figure 6:
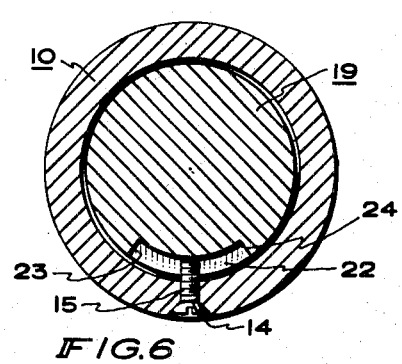

FIG. 6 is a transverse section taken along the line 6–6, illustrating the accommodation by a widened slotted area within the rear portion of the valve gate, thus a stop means for limiting both withdrawal displacement of the valve gate with respect to the valve body and, additionally, limiting the rotated displacement of the valve gate within the valve body in both clockwise and counterclockwise directions.

Figure 7:
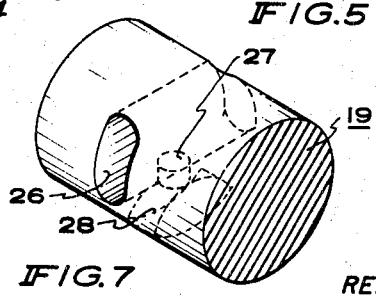

FIG. 7 is a perspective view of a portion of the valve gate.

Figure 1:
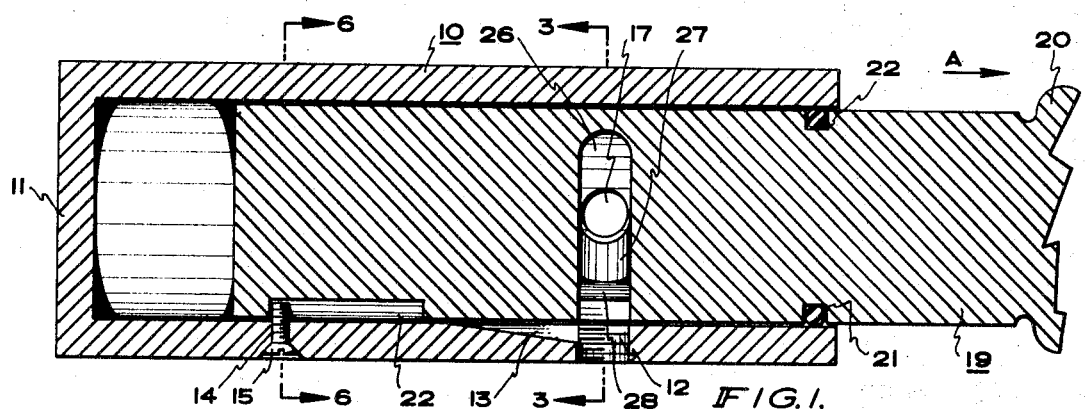
FIG. 1 is a central, elongate, vertical section of a mixing valve incorporating the features of the present invention.

In FIG. 1 cylindrical valve body 10 is shown to include and end 11, a valve body outlet orifice 12, a canted drain recess 13 contiguous therewith, and a threaded aperture 14 for threadedly receiving stop screw 15. Also included are preferably aligned opposite inlet orifices 16 and 17.

Slidably disposed within the valve body 10 is a cylindrical valve gate 19. The latter includes handle 20 and also O-ring groove 21 for seating O-ring 22.

Also included in the construction of cylindrical valve gate 19 is an arcuate recess 22 which cooperates with stop screw 15 in the manner shown. The purpose for stop screw 15 of course is to limit the travel of cylindrical valve gate 19 in the direction A shown in FIG. 1. FIG. 6 illustrates that the recess 22 may be designed such that the sides 23 and 24 thereof may be used to limit the rotational displacement of cylindrical valve gate 19 such that extreme displacements of member 19 do not exceed the configuration shown in FIG. 5, relative to one extremity of travel. It will be understood that the opposite wall of recess 22 will control a counter displacement of the valve gate 19 to the opposite angle relative to that shown in FIG. 5.

Figure 2:
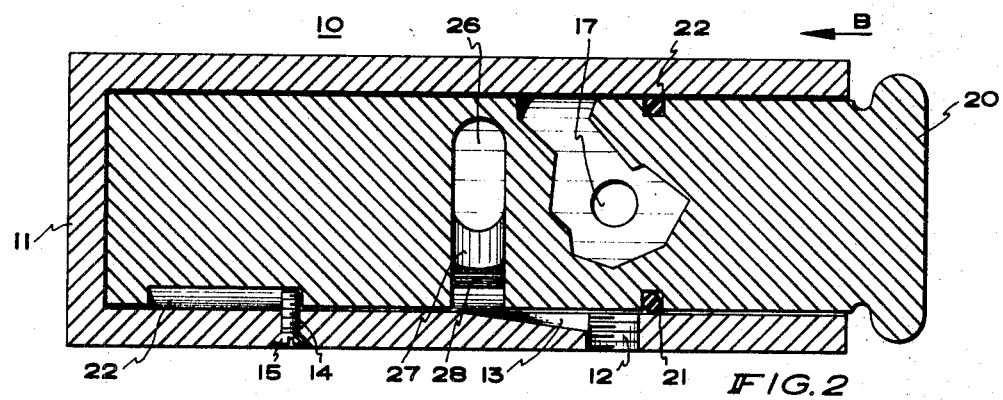
FIG. 2 is similar to FIG. 1 but illustrates the gate of the valve as being closed home so that the valve is completely shut off and the drain thereof effective to eliminate any fluid previously included within the mixing cavity of the valve.
Figure 3:
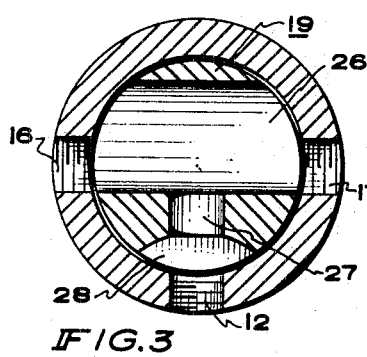
FIG. 3 is a transverse section, taken along the line 3–3, and illustrates the condition of the valve wherein the valve gate is in its central position within the valve body, thus communicating with both of the inlet orifices of the valve body in their full register.

Disposed in the cylindrical valve gate 19 is a composite, valve gate inlet aperture or cavity 26 which is elongated vertically in the manner shown in FIG. 2. It is seen that aperture 26 fully registers with both valve body inlet orifices 16 and 17 in FIG. 3; when the valve gate 19 is rotated, the will vary the ratio of the cross-sectional areas of inlet orifices 16 and 17 relative to communication with the composite aperture 26.

Figure 4:
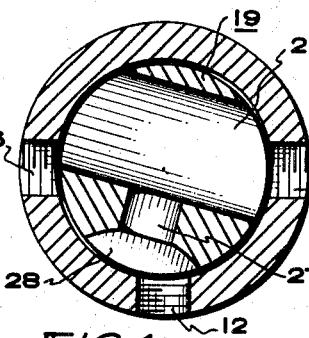
FIG. 4 is similar to FIG. 3 and illustrates the condition of the valve wherein the cylindrical valve gate has been rotationally displaced slightly within its valve body so as to meter one of the inlet orifices of the valve while retaining full flow condition with respect to the remaining orifice.

Disposed in communication with aperture 26 is a valve gate outlet orifice 27 which, in turn, communicates with registration recess or cavity 28 as seen in FIGS. 1 and 4. Recess 28 provides for communication of the outlet orifice 27 with valve body outlet orifice 12, for all permitted displacements of cylindrical valve body 10. It will be noted that outlet orifice 27, with its registration recess 28, is disposed in aligned condition with canted drain recess 13 when the handle 20 is advanced in the direction B as seen in FIG. 2.

Figure 5:
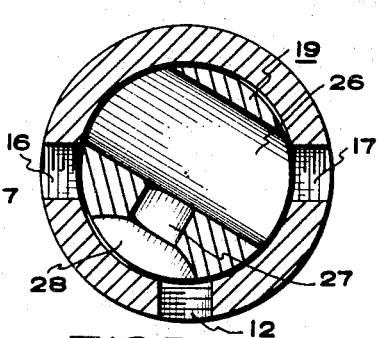
FIG. 5 is similar to FIG. 3 and illustrates a further progressive, rotational displacement (with respect to FIG. 4) of the valve gate within its valve body such that communication with one of the inlet orifices of the valve body is completely cut off, this while retaining full flow condition with regard to the remaining inlet orifice.

The structure as shown in drawings operates as follows. The initial condition of the valve, when not discharging fluid, is seen in FIG. 2. When one urges the cylindrical valve gate 19 outwardly in the direction A, this by grasping the handle 20 with the thumb and fingers or other means, the valve may be pulled such that stop screw 15 engages the rear most wall of recess 22. At this point the composite aperture or cavity 26 is disposed in line with a transverse plane passing vertically through the centers of inlet orifices 16 and 17. Rotation of handle 20 will rotationally displace the valve gate 19 from the central position shown in FIG. 3 to progressive displacements as shown in FIGS. 4 and 5. It will be understood that the valve gate can also be rotationally displaced in the opposite direction with reference to FIG. 3 relative to that shown in FIGS. 4 and 5. During such revolvement the O-ring seal 22 can keep the fluid from proceeding out of the combination of valve body 10 and valve gate 19. Of course, it will be understood that rather than use an O-ring seal, babbitt metal, a close fit between parts in the order of two thousandths of an inch, Teflon-coated operating surfaces of valve body 10 and valve gate 19, etc., may be employed. The precise nature of the sealing between the valve body and valve gates is strictly a matter of choice.

Referring to FIG. 2 it will be seen that the composite aperture 26 is elongated in a vertical direction along its cross section so that the rotation of the valve gate 19 within body 10 will accomplish alterations from full registration of both orifices 16 and 17 with respect thereto. Thus, as the valve gate 19 is displaced in a clockwise direction, the registration of inlet orifice 16 becomes less whereas the registration of inlet orifice 17 with respect to composite aperture 26 remains the same, this because of the vertical enlargement of aperture 26. It may indeed be achieved such that communication of inlet orifice 16 with cavity 26 is entirely cut off, whereas full communication of inlet orifice 17 with aperture or cavity 26 is preserved. It will be understood that the cylindrical valve gate 19 may be displaced in a counterclockwise direction and opposite to that shown in FIGS. 4 and 5.

Such revolvement of cylindrical valve gate 19 with end valve body 10 is enabled through the transverse, arcuate nature of recess 22 and its cooperation with stop screw 15. It likewise follows that the side abutments of recess 22 for stop screw 15 may be further extended such that there is a gradual but progressive metering of the remaining orifice 17, see FIG.

5, as the valve gate 19 is further displaced in a clockwise direction. Single input orifice metering can of course be accomplished for both directions of rotational displacement.

When the valve has been used and it is desired to turn off the same, the handle is simply pressed in the direction B until the valve body assumes its closed position within the valve gate within the valve body, see FIG. 2. In such event the canted drain 13 provides communication between composite cavity or orifice 26 with its outlet orifice 27 and recess 28 such that all fluid that may be present within the cylindrical valve gate 19 will be automatically drained out of the canted drain 13 and valve body outlet orifice 12.

Outlet orifice 12 is preferably threaded to include any tubular fixture or tap that might be desired to be threaded therein. Additional seals of course can be disposed between the valve body 10 and valve gate 19 to the left of composite aperture 26 as shown in FIGS. 1 and 2.

It is thus seen that the invention provides a mixing valve for mixing fluids, gases or liquids, of varying characteristics such as temperature, pressure, constituency, etc. The mixing valve can supply metered outlet of one or both fluids supplied to orifices 16 and 17, the ratio of the incoming fluids may be varied in accordance with the rotational displacement of valve gate 19 within cylindrical valve body 10, and registration of one inlet can be preserved even though another inlet orifice as in FIG. 4 (see orifice 16) is gradually metered to closed position.

The canted drain 13 in registration recess 28 insure the draining of liquid from within the interior of the valve prior to subsequent usage. This enables various sources to be affixed to the mixing valve as desired without chancing the mixing with present fluids of other fluids previously used.

While particular embodiments of the present invention have been shown and described, it will be obvious to those skilled in the art that changes and modifications may be made, and, therefore, the aim in the appended claims is to cover all such changes and modifications as fall within the true spirit and scope of this invention.

I claim:

1. A mixing valve including, in combination, a cylindrical valve body, a piston-like valve gate rotatably disposed and translationally movable within said valve body, means for rotationally displacing said valve gate within said valve body, said valve body including a pair of inlet orifices on opposite sides thereof and also an outlet orifice, said valve gate including a fluid mixing cavity dimensioned to comprise cross sectionally, vertically elongate, opposite contiguous aperture means selectively registerable with said inlet orifices and having an outlet registering with said valve body outlet orifice for a continuum of rotational displacements as well as translational displacements, to effect inlet orifice shutoff, of said valve gate within said valve body, said mixing cavity within said valve gate being constructed and arranged for full registration with a selected one of said inlet orifices, and, simultaneously, for progressively metered registration with the remaining one of said inlet orifices for all intended rotational displacements of said valve gate within said valve body, as selected by revolvement of said valve gate by said means, said valve gate being dimensioned for translational movement to effect nonregistration of said mixing cavity with said inlet orifices to achieve said inlet orifice shutoff.

2. Structure according to claim 1 wherein said valve body, valve gate combination is provided with drain aperture means positioned beneath for providing gravity drain communication between said mixing cavity of said valve gate and said outlet orifice of said valve body when said valve gate is moved along its longitudinal axis within said valve body to inlet orifice shutoff position.

3. A mixing valve, including, in combination, a valve body having an interior bore, a pair of inlet valve ports and an outlet orifice; a valve gate disposed for slideable movement within said bore along its longitudinal axis and including an interior mixing cavity selectively and variably communicating with said ports and said discharge orifice, said valve gate being constructed for selective movement within said bore such that said mixing cavity of said valve gate may be disposed out of registry with said inlet ports; and means for selecting desired registration of said ports with said mixing cavity, said valve body being provided with drain aperture means disposed beneath said valve gate and positioned for selective communication with said mixing cavity, for gravity draining fluid from said mixing cavity when said mixing valve is translated to inlet port shutoff position.